(12) United States Patent
Shih et al.

(10) Patent No.: US 11,780,031 B2
(45) Date of Patent: Oct. 10, 2023

(54) METHOD FOR LASER PROCESSING PACKAGING BOX

(71) Applicant: GREAT COMPUTER CORP., New Taipei (TW)

(72) Inventors: Liang Shih, New Taipei (TW); Heng-Kuan Lin, New Taipei (TW); Chia-Liang Lu, New Taipei (TW)

(73) Assignee: GREAT COMPUTER CORP., New Taipei (TW)

( * ) Notice: Subject to any disclaimer, the term of this patent is extended or adjusted under 35 U.S.C. 154(b) by 493 days.

(21) Appl. No.: 17/108,715

(22) Filed: Dec. 1, 2020

(65) Prior Publication Data

US 2022/0168849 A1    Jun. 2, 2022

(51) Int. Cl.
| | |
|---|---|
| *B31B 50/88* | (2017.01) |
| *B23K 26/38* | (2014.01) |
| *B65H 5/00* | (2006.01) |
| *B65H 7/14* | (2006.01) |
| *B23K 26/03* | (2006.01) |

(52) U.S. Cl.
CPC ............ *B23K 26/38* (2013.01); *B23K 26/032* (2013.01); *B31B 50/88* (2017.08); *B65H 5/00* (2013.01); *B65H 7/14* (2013.01)

(58) Field of Classification Search
CPC ..................................................... B31B 50/82
See application file for complete search history.

(56) References Cited

U.S. PATENT DOCUMENTS

| | | | |
|---|---|---|---|
| 6,117,270 A * | 9/2000 | Trokhan ................ | D21F 11/006 |
| | | | 428/137 |
| 10,150,285 B2 * | 12/2018 | Shaul ........................ | B41M 1/24 |
| 2017/0210149 A1 * | 7/2017 | Wyres ....................... | B41J 2/455 |
| 2020/0009684 A1 * | 1/2020 | Hibinger ............ | B23K 26/0838 |
| 2020/0187553 A1 * | 6/2020 | Fischer .................. | A24C 5/601 |

* cited by examiner

*Primary Examiner* — Timothy Kennedy
(74) *Attorney, Agent, or Firm* — Muncy, Geissler, Olds & Lowe, P.C.

(57) ABSTRACT

A method for laser processing a packaging box is provided, which includes feeding a paper material printed with a pattern on the front side thereof to a cutting machine by back feeding using an automatic paper feeder; performing edge finding on the rear side of the paper material, and forming indentations on the rear side of the paper material corresponding to where the pattern is on the front side; conveying the paper material to a laser cutting machine to perform registration marking on the rear side of the paper material before laser cutting; and finally performing laser cutting based on the registration markings to obtain a packaging box with the pattern printed on the front side and the indentations formed on the rear side.

4 Claims, 2 Drawing Sheets

METHOD FOR LASER PROCESSING PACKAGING BOX

FIELD OF THE INVENTION

The present invention relates to a method for laser processing a packaging box that forms indentations and performs cutting on the rear side of a paper material, and offers a simple and fast process while preventing damages to patterns printed on the front side of the paper material, which makes it particularly suitable for the existing process for cutting packaging boxes.

BACKGROUND OF THE INVENTION

The basic principle for a standard laser processing machine is to direct and focus light beams outputted by a laser on a surface of an object to be engraved. The focused light beams are then absorbed by the material. This raises the temperature of the material and vaporizes it, leaving recesses in the surface of the object, thereby accomplishing engraving and cutting.

During a laser process of a packaging box made of paper, a pattern can first be printed on its surface, and the surface can then be embossed and cut to form a predetermined shape. The embossed areas can then be folded to produce products with angular (e.g. square, rectangular, triangular, polygonal, etc.) appearances like those known on the market.

SUMMARY OF THE INVENTION

However, regardless of how the surfaces of the boxes or lids are processed and decorated, they typically have fold lines and indentations. During a process performed by a cutting machine, creating indentations on a pattern may result in cracking and/or decoloring of the pattern printed on the surface, which is not ideal.

The main objective of the present invention is to provide a method for laser processing a packaging box that is simple and fast and prevents damages to patterns on the surface of the paper material.

In order to achieve the above objective, the present invention provides a method for laser processing a packaging box, which includes the following steps of:

step a: feeding a paper material printed with a pattern on a front side thereof to the next processing step by back feeding using an automatic paper feeder;

step b: performing edge finding on a rear side of the paper material, and forming indentations on the rear side of the paper material corresponding to where the pattern is on the front side;

step c: performing registration marking on the rear side of the paper material before laser cutting;

step d: performing laser cutting based on the registration markings created in step c to obtain a packaging box with the pattern printed on the front side and indentations formed on the rear side.

In implementation, performing edge finding on a rear side of the paper material in step b includes reading the top, bottom, left and right edges of the paper material in the laser cutting machine to calculate an angle of deviation of the paper material resulting from paper feeding during step a, so that indentations can be formed after relative positions are calculated.

In implementation, indentations and registration markings of the paper material in steps b and c are created in a cutting machine, and laser cutting of the paper material is performed in a laser cutting machine.

In implementation, in step d, registration markings on the paper material are read by a CCD camera to confirm relative locations of the pattern before laser cutting is performed.

In order to more fully understand the present invention, preferred embodiments are set forth below with reference to attached drawings to illustrate the specific content of the present invention and the technical effects achieved in details.

DETAILED DESCRIPTION OF THE EMBODIMENTS

Figure 1:
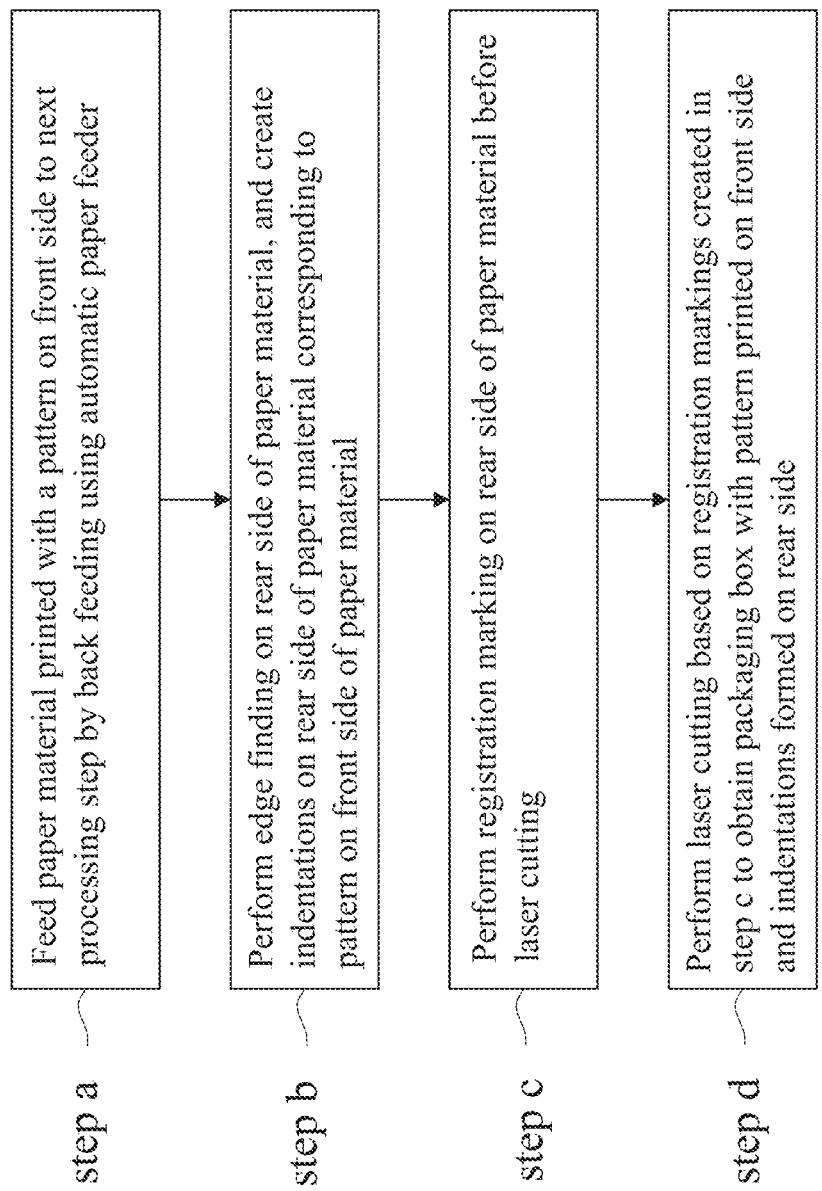
FIG. 1 is a flowchart illustrating an embodiment of the present invention.

Referring to FIG. 1, a flowchart illustrating a method for laser processing a packaging box, which includes the following steps:

step a: feeding a paper material printed with a pattern on a front side thereof to the next processing step by back feeding using an automatic paper feeder;

step b: performing edge finding on a rear side of the paper material, and forming indentations on the rear side of the paper material corresponding to where the pattern is on the front side;

step c: performing registration marking on the rear side of the paper material before laser cutting;

step d: performing laser cutting based on the registration markings created in step c to obtain a packaging box with the pattern printed on the front side and indentations formed on the rear side.

Figure 2:
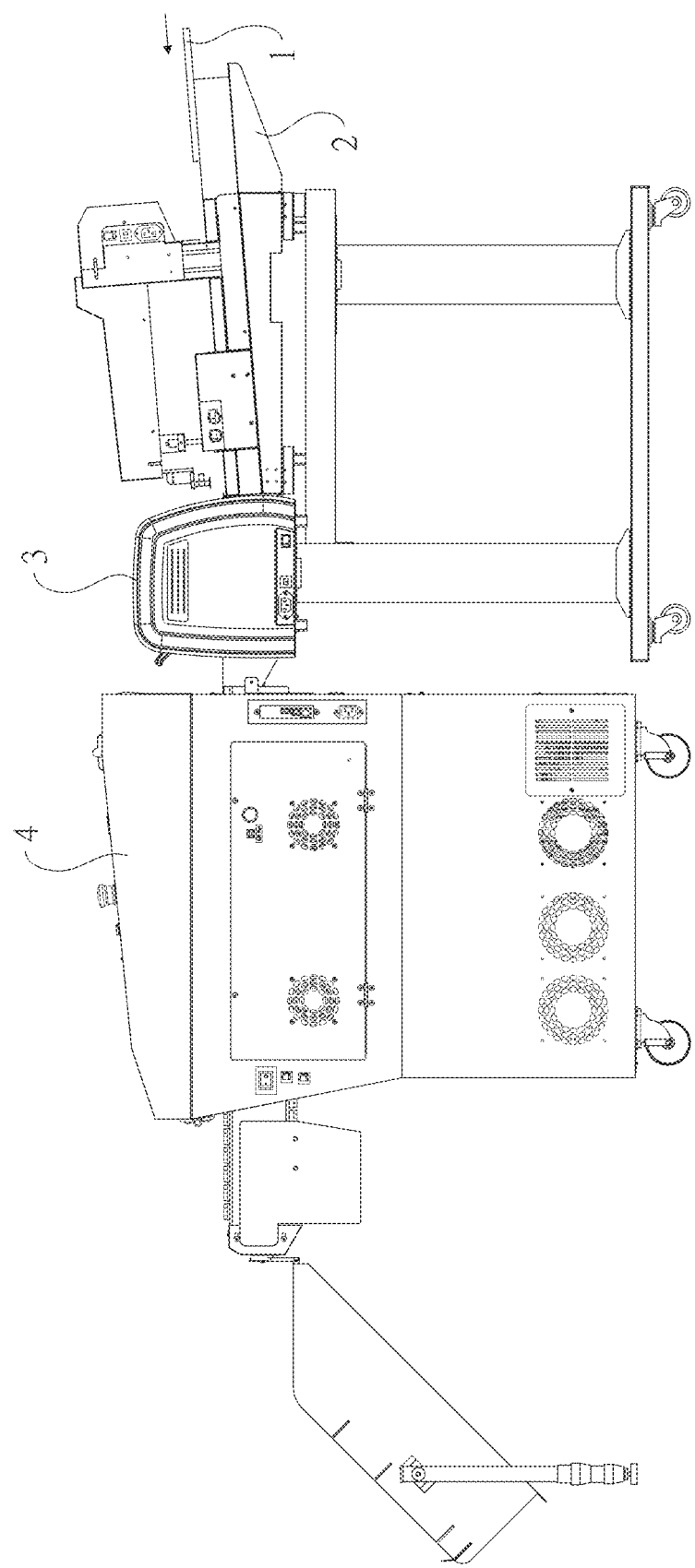
FIG. 2 is a schematic diagram depicting a process performed by machines in accordance with an embodiment of the present invention.

Referring to FIGS. 1 and 2, in actual implementation, the front side of a paper material 1 is first printed with a pattern using a printer, such as an inkjet printer. The paper material 1 is then fed by back feeding using an automatic paper feeder 2 to a cutting machine 3 (see FIG. 2). The top, bottom, left and right edges of the paper material 1 are located in the cutting machine 3 to calculate an angle of deviation of the paper material 1 resulting from paper feeding during step a. Indentations can then be formed after relative positions are calculated to form indentations on the rear side of the paper material 1 corresponding to where the pattern is on the front side. Finally, before pattern cutting is performed, since the paper material is fed by back feeding, registration marking needs to be performed on the rear side of the paper material 1 in step c. Once marking is completed, the paper material 1 is conveyed to the next processing step through rollers on the cutting machine and a laser y-axis suction cup module, and then the paper material 1 is conveyed to the laser cutting machine 4 for laser cutting, wherein, in step d, the registration markings on the paper material 1 are read by a CCD camera to confirm the relative locations of the pattern before laser cutting is performed.

Therefore, with the above configuration, by back feeding of the paper material in conjunction with edge finding, indentations can be formed on the rear side of the paper material to prevent damage to the patterns (e.g. cracking, decoloring, etc.), while improving product accuracy and reducing the generation of waste material. Moreover, since the paper is fed from the rear side, in order for laser cutting to be performed accurately on the paper material, the present invention provides the step of registration marking, such that accurate cutting can still be achieved on the rear side of the paper material.

The above descriptions provide merely specific embodiments of the present invention and technical means used by the present invention. It should be noted that numerous variations and modifications derived from the inventions or teaching herein should be regarded as equivalents of the present invention, and the effects created by such variations and modifications will not go beyond the spirit covered the specification and the drawings, and should be construed as within the technical scope of the present invention.

In conclusion, according to the inventions above, the present invention achieves the expected objectives by providing a method for laser processing a packaging box including forming indentations and cutting on the rear side of the paper material, which is in contrast to the prior art in which damages to the pattern may occur during processing on the front side of the paper material. The present invention provides good industrial values.

What is claimed is:

1. A method for laser processing a packaging box, comprising the following steps of:
   step a: feeding a paper material printed with a pattern on a front side thereof to the next processing step by back feeding using an automatic paper feeder;
   step b: performing edge finding on a rear side of the paper material, and forming indentations on the rear side of the paper material corresponding to where the pattern is on the front side;
   step c: performing registration marking on the rear side of the paper material before laser cutting;
   step d: performing laser cutting based on the registration markings created in step c to obtain a packaging box with the pattern printed on the front side and indentations formed on the rear side.

2. The method for laser processing a packaging box of claim 1, wherein performing edge finding on a rear side of the paper material in step b includes reading the top, bottom, left and right edges of the paper material in a cutting machine to calculate an angle of deviation of the paper material resulting from paper feeding during step a, and forming indentations after relative positions are calculated.

3. The method for laser processing a packaging box of claim 1, wherein indentations and registration markings of the paper material in steps b and c are created in a cutting machine, and laser cutting of the paper material is performed in a laser cutting machine.

4. The method for laser processing a packaging box of claim 1, wherein in step d, registration markings on the paper material are read by a charge-coupled device (CCD) camera to confirm relative locations of the pattern before laser cutting is performed.

* * * * *